Feb. 2, 1926.

V. J. MORRIS 1,571,678

BAKING UTENSIL

Filed July 2, 1925

INVENTOR
Vernon J. Morris
BY
Albert H. Adams.
ATTORNEY

Patented Feb. 2, 1926.

1,571,678

UNITED STATES PATENT OFFICE.

VERNON J. MORRIS, OF SEATTLE, WASHINGTON.

BAKING UTENSIL.

Application filed July 2, 1925. Serial No. 41,047.

*To all whom it may concern:*

Be it known that I, VERNON J. MORRIS, a subject of the King of Great Britain, residing at Seattle, in the county of King and State of Washington, have invented a new and useful Baking Utensil, of which the following is a specification.

My invention relates to a utensil comprising a plurality of receptacles, such as pans in which loaves of bread are baked, that are so connected together that they form a unitary device that may be handled by an ordinary peel in the act of inserting the utensil into an oven or removing it therefrom. In the constructions now in general use the several pans of such a utensil have their bottoms all in the same plane so that they all rest substantially evenly and to the same extent upon the horizontal surface of a table or the floor of an oven. Such construction is objectionable because of the fact that the workman in attempting to push the peel under the utensil will not direct it properly so as to slide under the utensil but will cause it to strike against the side wall of one of the end pans or against the end wall of one or more of the intermediate pans, accordingly as the peel is attempted to be inserted beneath the utensil at one end or at one side thereof. The peel is usually given a quick stroke to carry it completely beneath the utensil and when it is improperly directed and hence hits against a wall of the pan, as stated, such pan is apt to, and frequently does, become dented, whereby the interior surface of that wall loses the smooth and even surface that is so essential to the ready removal from the pan of the baked loaf and, of course, such denting of the wall impairs the appearance of that portion of the loaf that has rested against it during the baking operation.

The object of my invention is to so construct a utensil of the general character mentioned that the peel may be inserted thereunder with but little liability of it striking against and denting a wall of one of the pans. Briefly stated, I accomplish this object by securing the end pan members of the utensil in a slightly inclined position so that the respective bottoms thereof extend upward from the inner lower edge of the pan, whereby a wedge-shaped space is provided under each end pan to receive the peel when such peel is to be inserted beneath the utensil from one end thereof. Furthermore, I attain this desired inclination of the end pans by securing them so that their lower inner edges are below the planes of the horizontally-maintained intermediate pan or pans, whereby the utensil as a whole will rest upon such depressed inner edge portions of the two outer pans and consequently leave a clear space under the central portion of the utensil to receive the peel when such peel is to be inserted beneath the utensil from one side thereof. In the accompanying drawing is shown a construction and arrangement of parts embodying my improvements, but it is to be understood that, except as limited by the specific wording of some of the appended claims, my invention is not intended to be limited to the precise construction shown.

In the drawing:—

Figure 3:
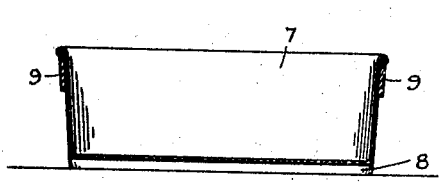
Fig. 3 is a cross-section taken at line 3—3 of Fig. 2.
Figure 4:
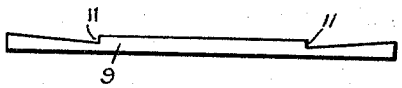
Fig. 4 is a view of one of the side bars to which the several pans of the utensil are secured.
Figure 2:
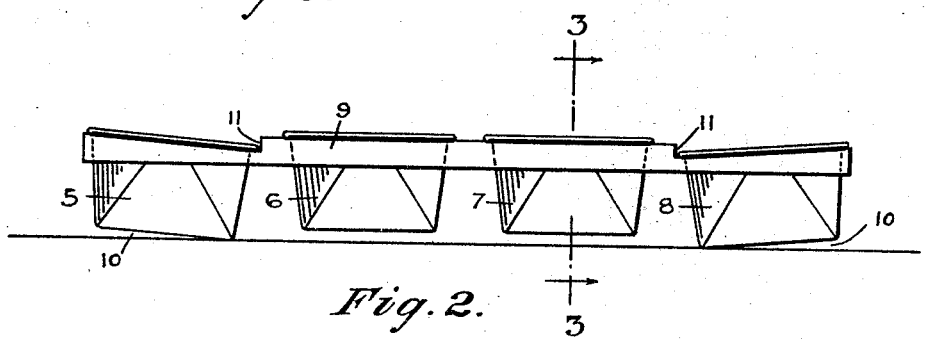
Fig. 2 is a side elevation of the utensil shown in Fig. 1.
Figure 1:
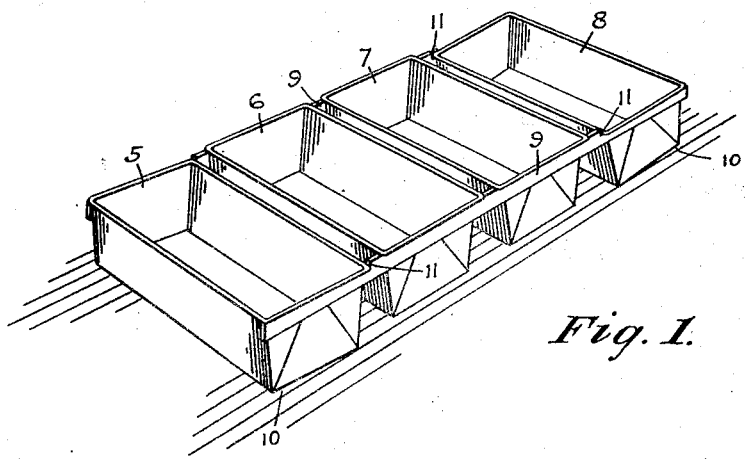
Fig. 1 is a perspective view of a utensil embodying my improvements.

Referring to the several figures of the drawing—5, 6, 7 and 8 indicate, respectively, four ordinary bread pans arranged in a row side by side and spaced from each other as shown. 9—9 indicate two metal bars, that lie across the outer surfaces of the end walls of the pans and to which such pans are securely attached by spot-welding or in any other suitable manner. Preferably these bars will be so positioned that their upper edges will be directly under and be in contact with the usual outwardly-extending bead or flange at the upper edges of the pans. As clearly shown in the drawing while the pans 6 and 7, that constitute the central portion of the utensil as a whole, have their bottoms maintained horizontally when the utensil is in normal position the two end pan members 5 and 8 are so inclined that their bottoms extend outwardly and upwardly from said central portion whereby there is necessarily left between their bottoms and any horizontal surface upon which the utensil rests a wedge shaped space, indicated at 10, for a peel to enter when it is desired to move the utensil into or out of an oven. In the construction shown this inclination of the end pan members is accomplished by notching or cutting away in a diagonal manner, as shown at 11, the end portions of the upper edges of the bars 9, and resting on such diagonally-inclined edge portions the marginal beads or flanges of said end pan members, the degree of inclination of such bar edges determining, therefore, the size of the space beneath the bottoms of the end pans.

Notching or cutting away the upper edges of the bars 9 as shown and described, in addition to determining the degree of inclination of the end pan members when their marginal beads or flanges rest on such inclined edge portions serves also, as will be apparent, to bring the inner lower edges of those end members below the horizontal plane of the bottoms of the pans 6 and 7 that form the intermediate portion of the utensil, and thus such inner lower edges are the only parts of the utensil that will be in contact with whatever horizontal surface the utensil may be placed upon. This is of material advantage in two respects, first, a peel when being pushed under the utensil from one of the ends will encounter only those two inner lower edges above referred to and hence will move with less friction than if it moved against the bottoms of all the pans as in former constructions, and, second, by reason of the bottom of the central portion of the utensil, (and which central portion is here shown as composed of the two pans 6 and 7) being in a higher plane than that occupied by said supporting edges there will be afforded a clear space for the peel when such peel is applied at one side of the utensil. From whichever way, therefore, that the peel is inserted beneath the utensil the liability of it being forcibly pushed aganst any wall of a pan is greatly lessened, with the result that the life of the utensil will be materially lengthened.

While I have shown a baking utensil comprising four pans and have referred to them as bread pans it is to be understood that that number may be varied from and also that the utensil may be employed in connection with the baking of other articles than bread and the claims are to be construed accordingly.

What I claim as new and desire to secure by Letters Patent is as follows:

1. A baking utensil comprising a plurality of pans arranged in a row and means for holding them together, the pan at each end of the row being inclined upwardly and outwardly relative to the portion of the utensil between said end pans so that its bottom is inclined in the same direction.

2. A baking utensil comprising a plurality of pans arranged in a row and means for holding them together, the pan at each end of the row having its bottom inclined upwardly from its inner lower edge.

3. A baking utensil comprising a plurality of pans arranged in a row and means for holding them together, the pans at each end of the row having their bottoms vertically inclined whereby each of said end bottoms is adapted to rest on an edge portion only, and that portion of the utensil between the said end pans being in a higher plane than the lowest portion of said end pans.

4. A baking utensil comprising a plurality of pans arranged in a row and means for holding them together, the pan at each end of the row being inclined upwardly and outwardly and having its inner lower edge extending below the bottom of that portion of the utensil that is between said end pans.

5. A baking utensil comprising a plurality of pans arranged in a row and means for holding them together, the pan at one end of the row having a flat bottom that is inclined upwardly and outwardly whereby it is adapted to rest on its inner edge only.

6. A baking utensil comprising a plurality of pans arranged in a row and means for holding them together, the pan at one end of the row having its bottom inclined upwardly and outwardly and its inner lower edge extending below the bottom portion of that part of the utensil that is between the two end pans.

7. A baking utensil comprising a plurality of pans arranged in a row and means for holding them together, the pan at each end of the row having its bottom inclined upwardly from its inner lower edge, and the bottom portion of the utensil between the said end pans being substantially horizontal and in a higher plane than that occupied by the said inner lower edges of the end pans.

8. A baking utensil comprising a plurality of pans arranged in a row, said pans having outwardly-extending flanges at their upper margins, and two bars secured to the outer faces of opposite walls of said pans, each of said bars having an inclined upper edge portion opposite the pan at each end of the row and on which inclined edges the flanges of the said end pans rest so that the bottoms of such end pans are inclined in the same directions as the said inclined edge portions of the bars.

VERNON J. MORRIS.